United States Patent
Wang et al.

(10) Patent No.: US 9,573,417 B2
(45) Date of Patent: Feb. 21, 2017

(54) HUBLESS WHEEL

(71) Applicant: Shanghai Magic Wheels Sporting Goods Co., Ltd., Shanghai (CN)

(72) Inventors: Xiu Ping Wang, Shanghai (CN); Lei Feng, Shanghai (CN)

(73) Assignee: Shanghai Magic Wheels Sporting Goods Co., Ltd., Shanghai (CN)

( * ) Notice: Subject to any disclaimer, the term of this patent is extended or adjusted under 35 U.S.C. 154(b) by 0 days.

(21) Appl. No.: 14/678,149

(22) Filed: Apr. 3, 2015

(65) Prior Publication Data

US 2015/0283853 A1    Oct. 8, 2015

(30) Foreign Application Priority Data

Apr. 4, 2014   (CN) ..................... 2014 2 0162374 U

(51) Int. Cl.
*B60B 25/18*    (2006.01)
*A63C 17/22*    (2006.01)
(Continued)

(52) U.S. Cl.
CPC ............. *B60B 25/18* (2013.01); *A63C 17/223* (2013.01); *A63C 17/226* (2013.01); *B60B 3/001* (2013.01);
(Continued)

(58) Field of Classification Search
CPC .......... B60B 25/18; B60B 3/048; B60B 19/00; B60B 3/001
See application file for complete search history.

(56) References Cited

U.S. PATENT DOCUMENTS

| 4,045,096 A | 8/1977 | Lidov |
| 6,839,939 B2 * | 1/2005 | Donakowski ........... B60B 3/048 16/18 R |

(Continued)

FOREIGN PATENT DOCUMENTS

| CN | 101516642 A | 8/2009 |
| EP | 2578481 A2 | 4/2013 |

OTHER PUBLICATIONS

Shanghai Magic Wheels Sporting Goods Co., Ltd., European Application No. 15162165.3, Extended European Search Report, Oct. 5, 2015.

*Primary Examiner* — John Walters
*Assistant Examiner* — James Triggs
(74) *Attorney, Agent, or Firm* — Michael G. Johnston; Moore & Van Allen PLLC

(57) ABSTRACT

The invention discloses a wheel structure and a scooter comprising the wheel structure. The wheel structure comprises: an inner rim having a first inner annular face and a first outer annular face that are arranged radially, the first inner annular face is hollow and provided with an interface for connecting to a steering mechanism of the scooter; an outer rim having a second inner annular face which is arranged radially and a second outer annular face for contacting the ground; wherein an intermediate connecting assembly is disposed between the first outer annular face of the inner rim and the second inner annular face of the outer rim, and the outer rim, without need for hub, contacts the inner rim in a rolling manner via the intermediate connecting assembly and is rotatable relative to the inner rim. The wheel structure does not contain a hub and presents a hollow visual effect of the wheel.

9 Claims, 5 Drawing Sheets

(51) Int. Cl.
*B60B 3/00* (2006.01)
*B60B 3/04* (2006.01)
*B60B 19/00* (2006.01)
B62K 3/00 (2006.01)
A63C 17/01 (2006.01)
A63C 17/16 (2006.01)

(52) U.S. Cl.
CPC ............. *B60B 3/048* (2013.01); *B60B 19/00* (2013.01); *A63C 17/014* (2013.01); *A63C 17/16* (2013.01); *B62K 3/002* (2013.01)

(56) References Cited

U.S. PATENT DOCUMENTS

| | | | | |
|---|---|---|---|---|
| 7,337,862 | B1 * | 3/2008 | Greenley | A63H 17/25 180/10 |
| 8,113,524 | B2 * | 2/2012 | Karpman | A63C 17/016 280/11.19 |
| 2013/0154220 | A1 * | 6/2013 | Stroppiana | B62K 3/002 280/87.041 |

* cited by examiner

HUBLESS WHEEL

FIELD OF THE INVENTION

The invention relates to a wheel structure.

The invention further relates to a scooter comprising the above wheel structure.

BACKGROUND

Sport entertainment apparatus are being developed continuously. As a modern entertainment apparatus, the scooter has gradually entered individual families. The scooter can be either used as novel means of transportation, or as an entertainment apparatus, which therefore brings about a lot of convenience and happiness to people's lives. Therefore, the scooter has become very popular among people, especially the youth.

The steering mechanism of a scooter is typically disposed at a front end of the body. When performing a steering operation, the pedal is inclined to generate a steering torque, which is transmitted by the steering mechanism, eventually realizing turning of the front wheels. As is well known, the structure of a prior art wheel comprises at least an outer wheel, a hub and an inner wheel, wherein the outer wheel contacts the ground, the inner wheel is connected to the steering structure, and the hub is located between the outer wheel and the inner wheel. The prior art wheel is complicated in structure and has numerous parts and components, thus requiring complex steps of assembly and consuming time.

SUMMARY OF THE INVENTION

The technical problem to be solved by the invention is to provide a wheel structure of a scooter, which forms a hollow wheel without need for hub.

The wheel structure of the scooter in the invention comprises: an inner rim having a first inner annular face and a first outer annular face that are arranged radially, the first inner annular face is hollow and provided with an interface for connecting to a steering mechanism of a scooter; an outer rim having a second inner annular face which is arranged radially and a second outer annular face for contacting the ground; wherein an intermediate connecting assembly is disposed between the first outer annular face of the inner rim and the second inner annular face of the outer rim, and the outer rim without need for hub, contacts the inner rim in a rolling manner via the intermediate connecting assembly and is rotatable relative to the inner rim.

Optionally, in the above wheel structure, the intermediate connecting assembly is a conventional rolling bearing.

Optionally, in the above wheel structure, the conventional rolling bearing is interposed between the inner rim and the outer rim by means of being incorporated, nesting or snap fit.

Optionally, in the above wheel structure, the inner rim is axially divided into a first separated body and a second separated body, wherein the first separated body and the second separated body are each provided with an end cap which can shield the conventional rolling bearing after assembly, and the first separated body and the second separated body are connected by axial screws.

Optionally, in the above wheel structure, the end cap is radially extended to such an extent that the outside diameter thereof is equivalent to the diameter of the second inner annular face of the outer rim, and there is a gap between the end cap and the outer rim in the axial direction.

Optionally, in the above wheel structure, the intermediate connecting assembly comprises an annular bracket and rollers disposed on the bracket, wherein the intermediate connecting assembly surrounds the inner rim, and the rollers are sandwiched between the first outer annular face and the second inner annular face after assembly.

Optionally, in the above wheel structure, one of the interface and the steering mechanism of the scooter is provided with a platform, and the other is provided with a flat plate structure; the platform is provided with a notch for receiving the flat plate structure, and the flat plate structure and the notch are connected via riveting.

Optionally, in the above wheel structure, the flat plate structure is provided at a distal end of the steering mechanism, and the platform is provided as a radially projecting structure on the first inner annular face of the inner rim.

The invention provides a novel wheel whose structure contains no hub, and which can bring about a hollow visual effect of the wheel. Such a wheel can incorporate therein a conventional bearing or another alternative structure which functions as well by rubber coating, snap fit or via a customized structure.

Another aspect of the invention relates to a scooter which comprises a steering mechanism, wherein the wheel connected to the steering mechanism is a wheel structure according to any of the above described.

Other aspects and features of the invention will become apparent from the detailed description with reference to the accompanying drawings. However, it is understood that the accompanying drawings are designed only for the purpose of explanation, rather than limiting the scope of the invention, since the scope of protection should be defined by appended claims. It should be also understood that the accompanying drawings merely intend to illustrate the structure and flowchart described herein in a schematic way and are not necessarily drawn to scale, unless otherwise specified.

BRIEF DESCRIPTION OF THE DRAWINGS

Detailed description of the particular embodiments will be given below with reference to accompanying drawings, from which the invention will be more fully understood. Identical elements are denoted by identical reference signs throughout the drawings, wherein.

DETAILED DESCRIPTION OF THE INVENTION

The particular embodiments of the invention will be described hereinafter in detail with reference to the accompanying drawings in order that those skilled in the art will precisely understand the subject matter for which protection is sought by the invention.

Figure 1:
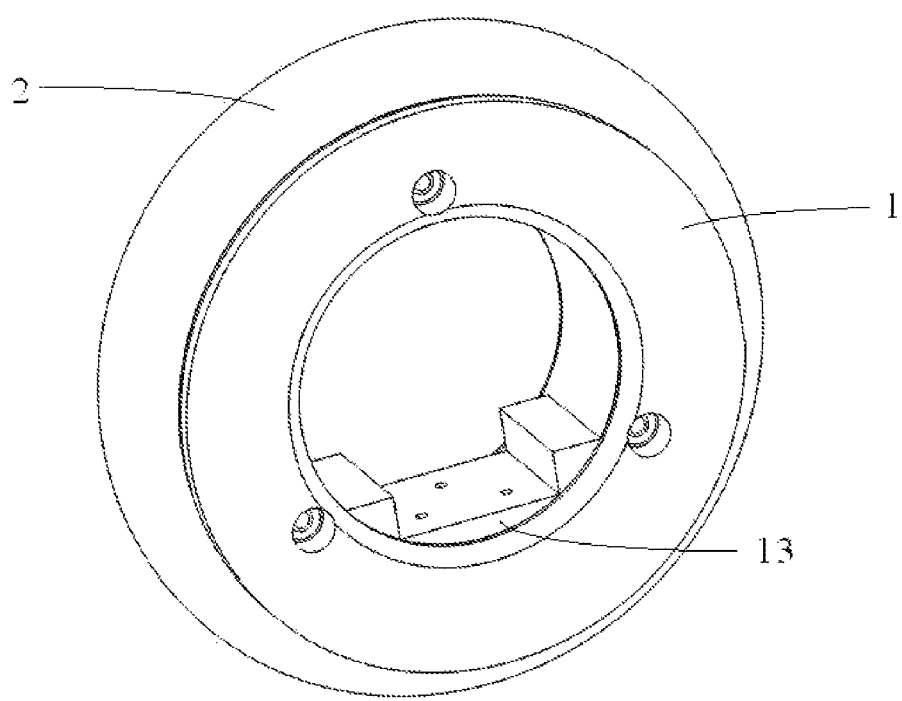
FIG. 1 is a schematic structural view of an embodiment of the wheel structure of the invention.
Figure 2:
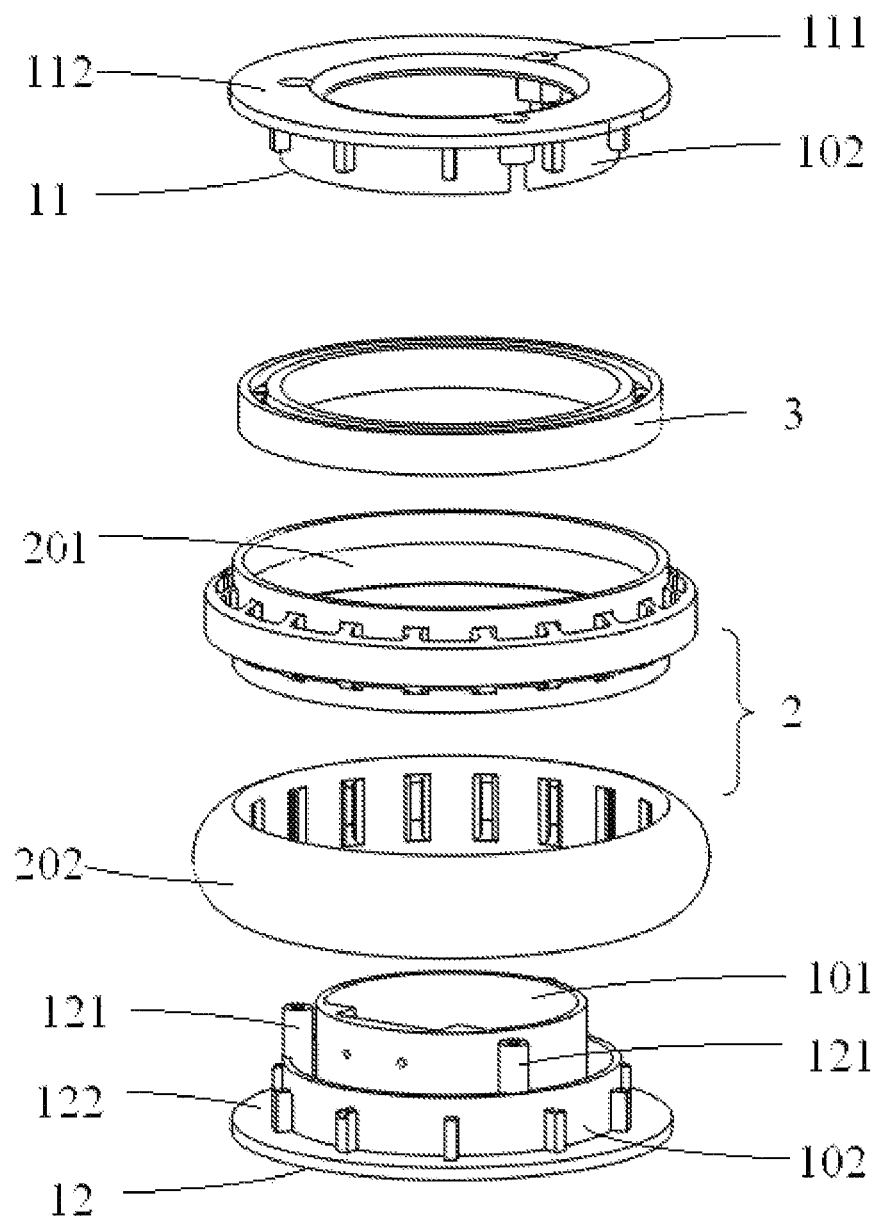
FIG. 2 is an exploded view of the wheel structure shown in FIG. 1.

Reference is now made to FIGS. 1 to 2, which are a schematic structure view and an explode view of the wheel structure of a scooter in accordance with the invention, respectively. The wheel at least comprises an inner rim 1, an outer rim 2 and an intermediate connecting assembly 3. The outer rim 2, without need for hub, contacts the inner rim 1 in a rolling manner via the intermediate connecting assembly 3 and is rotatable relative to the inner rim 1. In FIG. 2, the inner rim 1 has a first inner annular face 101 and a first outer annular face 102 that are arranged radially, wherein the first inner annular face 101 is hollow and provided with an interface 13 for connecting to the steering mechanism 4 of the scooter. The inner rim 1 can be made from a single component as shown in the figure, or can be formed by integrating two components (or more than two components) together via a certain process. Specifically, the inner rim 1 is axially divided into a first separated body 11 and a second separated body 12, and the first inner annular face 101 and the first outer annular face 102 are formed on one or two of the first separated body 11 and the second separated body 12. As shown in the embodiment, the first inner annular face 101 is formed on an inside surface of the second separated body 12; after the first separated body 11 and the second separated body 12 are assembled, outside surfaces thereof form the first outer annular face 102 altogether. The first inner annular face 101 is connected to the steering mechanism 4, whereas the first outer annular face 102 provides possibility for installing the intermediate connecting assembly 3 and the outer rim 2. The first separated body 11 and the second separated body 12 are connected by axial screws. Specifically, the first separated body 11 and the second separated body 12 are each provided with holes 111 and 121 for receiving screws. The outer rim 2 has a second inner annular face 201 which is arranged radially and a second outer annular face 202 for contacting the ground. The outer rim 2 can be formed by integrating two components (or more than two components) together via a certain process as shown in the figure, or can be made from a single component, wherein the second inner annular face 201 is formed on an inside surface of the whole outer rim 2.

The intermediate connecting assembly 3 is disposed between the first outer annular face 102 of the inner rim 1 and the second inner annular face 201 of the outer rim 2. The intermediate connecting assembly 3 may comprise an inner ring 301 and an outer ring 302, as well as rollers 303 sandwiched between the inner ring 301 and the outer ring 302. The inner ring 301 is secured to the first outer annular face 102 of the inner rim 1 in a certain manner, and the outer ring 302 is secured to the second inner annular face 201 of the outer rim 2 in a certain manner. When the outer rim 2 is rotated, the outer ring 302 will rotate therewith, and the inner ring 301 and the inner rim 1 are stationary, thus realizing a rotating effect. The intermediate connecting assembly 3 can be a conventional rolling bearing, such as commercially available plastic bearing and rubber coating bearing, which is interposed between the inner rim 1 and the outer rim 2 in any way that can be envisaged by those skilled in the art, such as being incorporated, nesting or snap fit.

Figure 3:
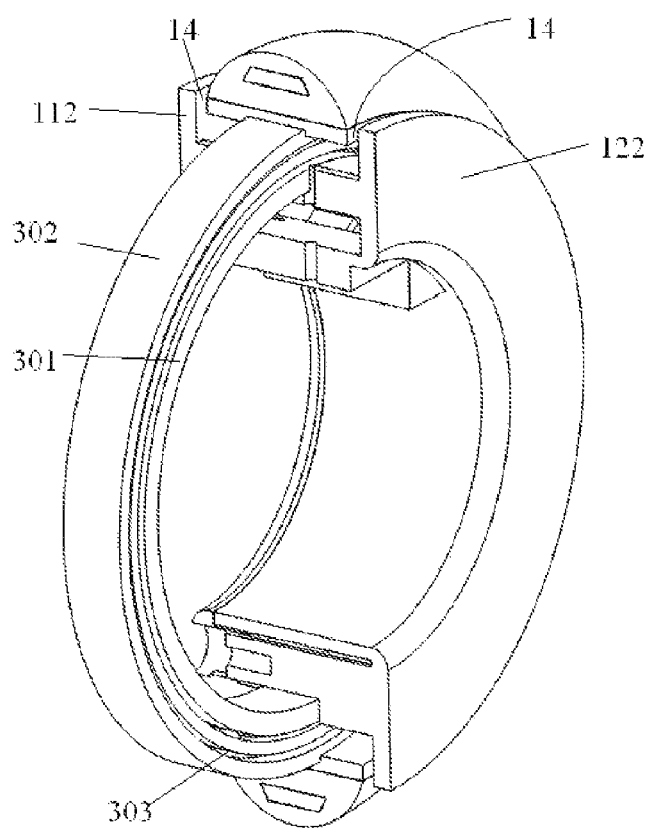
FIG. 3 is a partial sectional view of the wheel structure shown in FIG. 1.

End caps 112 and 122 are further provided at edges of the first separated body 11 and the second separated body 12. With reference to FIGS. 2 and 3, the end caps 112 and 122 radially extend from the first separated body 11 and the second separated body 12 (i.e., from the first outer annular face 102). Due to the functions of the end caps 112 and 122, the intermediate connecting assembly 3 can be shielded. The end caps 112 and 122 are radially extended to such an extent that the outside diameters thereof are equivalent to the diameter of the second inner annular face 201 of the outer rim 2. In this way, the end caps 112 and 122 visually block the intermediate connecting assembly 3, thus providing an aesthetics effect. Moreover, there is a gap 14 between the end caps 112 and 122 and the outer rim 2 in the axial direction so as to avoid interference with rotation of the outer rim 2.

Figure 4:
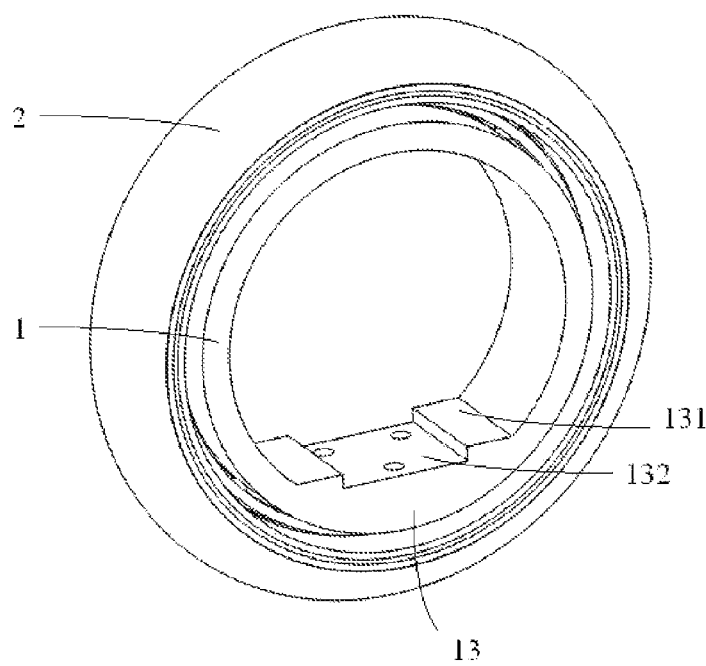
FIG. 4 is a schematic structural view of another embodiment of the wheel structure of the invention.
Figure 5:
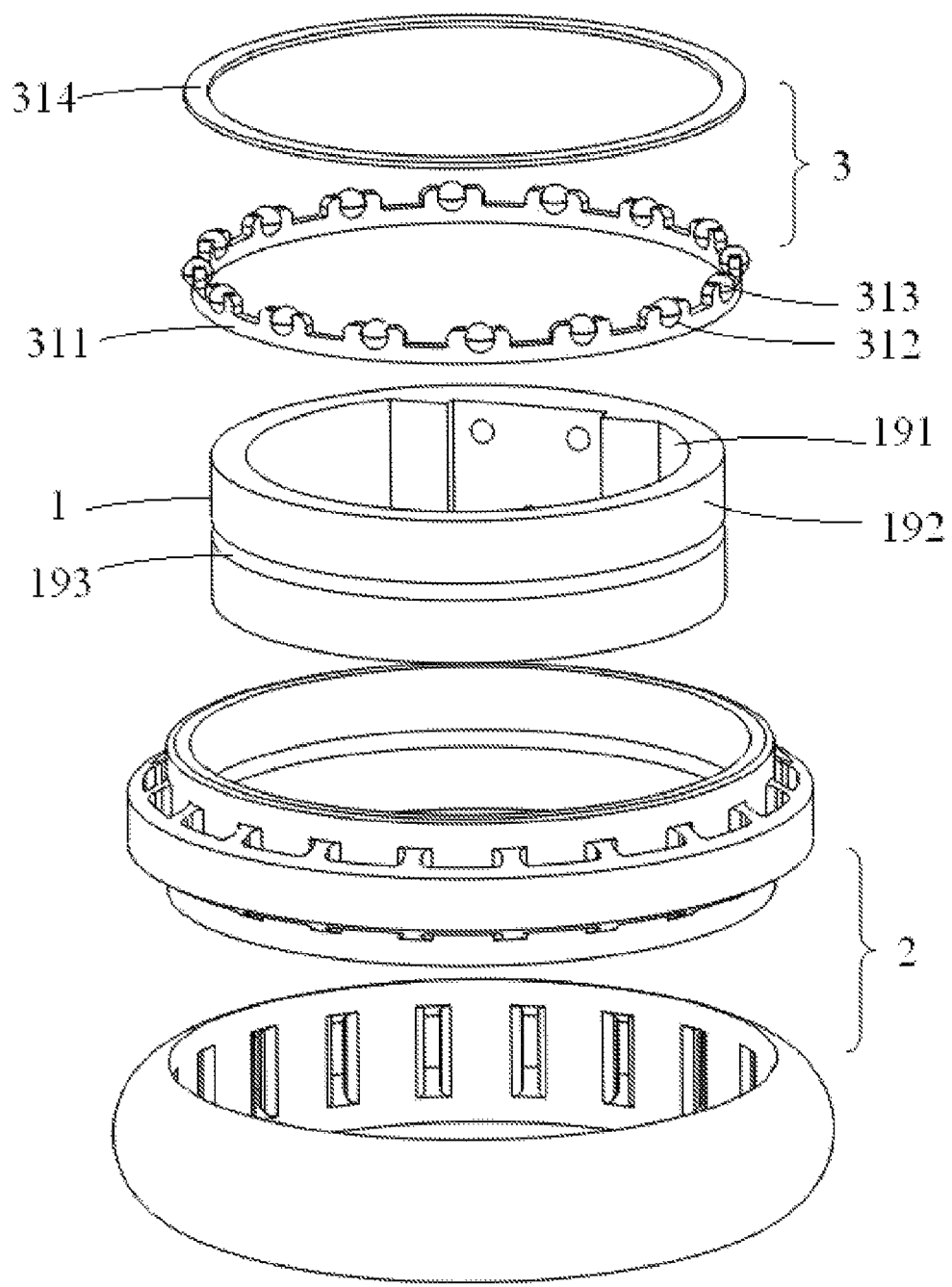
FIG. 5 is an exploded view of the wheel structure shown in FIG. 4.
Figure 6:
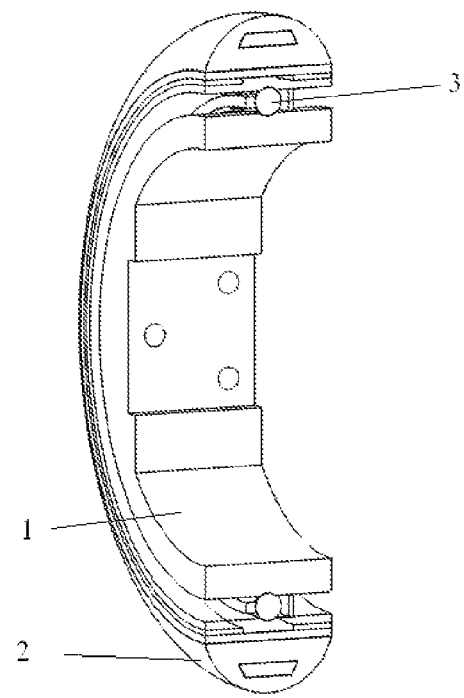
FIG. 6 is a partial sectional view of the wheel structure shown in FIG. 4.

Reference is now made to FIGS. 4 and 5, which are a schematic structure view and an explode view of another embodiment of the wheel structure of a scooter in accordance with the invention, respectively. As can be seen from the figures, the wheel at least comprises an inner rim 1, an outer rim 2 and an intermediate connecting assembly 3, wherein the structure of the outer rim 2 is the same of that in the first embodiment. The inner rim 1 is made from a single component, wherein a first inner annular face 191 is formed on an inside surface and a first outer annular face 192 is formed on an outside surface. The first inner annular face 191 is also provided with an interface 13 for connecting to the steering mechanism 4. A step 193 is provided on the first outer annular face 192 for arranging the intermediate connecting assembly 3 thereon. The intermediate connecting assembly 3 at least comprises an annular bracket 311 and rollers 313, wherein the bracket 311 is provided with a plurality of grooves 312, into each of which can be placed one roller 313. During assembly of the inner rim 1 and the outer rim 2, the intermediate connecting assembly 3 surrounds the inner rim 1 and the rollers 313 are sandwiched between the first outer annular face 192 and the second inner annular face 201, and a ring shield 314 is installed to prevent the rollers 313 from falling. In this embodiment, the intermediate connecting assembly 3 is simplified, and the whole wheel can be considered as an individual bearing. When the outer rim 2 is rotated, the inner rim 1 is stationary due to the function of rollers 313. In the illustrated embodiment (including FIG. 6), the inner rim 1 is not provided with an end cap; those skilled in the art will understand that the inner rim 1 can be also provided with an end cap at an edge thereof.

Figure 7:
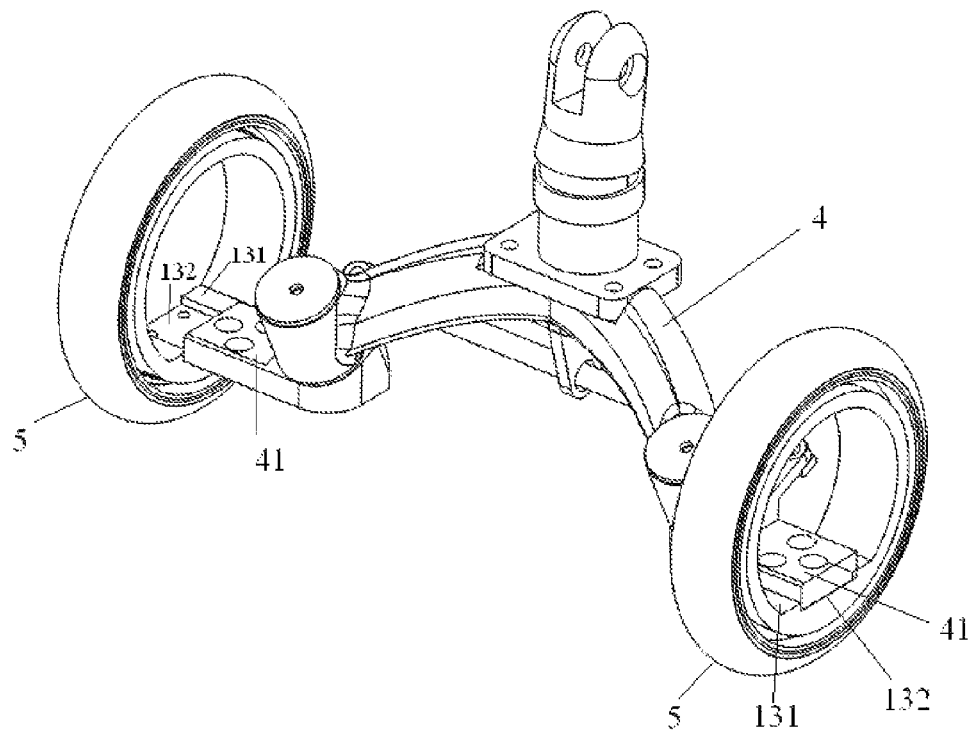
FIG. 7 is a partial sectional view showing the structure of a scooter incorporating the embodiment of wheel structure shown in FIG. 4.

Taking the interface 13 of the inner rim 1 in this embodiment as an example, with reference to FIGS. 4 and 7, the interface 13 is a radially projecting platform 131 on the first inner annular face 191 of the inner rim 1 for connecting to a distal end of the steering mechanism 4 of the scooter. Specifically, the platform 131 is provided with a concave notch 132, and the distal end of the steering mechanism 4 of the scooter is a flat plate structure 41, which well fits with the concave notch 132 and is fixedly connected with the concave notch 132 by riveting. Therefore, such a wheel structure presents a hollow hub-free visual effect. Those skilled in the art will understand that the form of the interface 13 is not limited to any of the above-described embodiments. It is also possible that the platform (including the notch) is provided at the distal end of the steering mechanism of the scooter; alternatively, the riveting hole is arranged axially. All these forms enable a connection between the steering structure and the wheel. In FIG. 7, the scooter has two active front wheels 5, and the steering mechanism 4 is provided at a front end, i.e., both ends of the steering mechanism 4 are provided with the wheel structure of the invention respectively.

Those skilled in the art will understand that the wheel structure of the invention is not merely used for a scooter; rather, it can be also applied to the wheel of any kind of vehicle or the wheel of an object that needs to be moved.

The above described particular embodiments merely serve to illustrate the invention, rather than liming the invention. Those skilled in the art can make various modifications and variations to the invention without departing from the scope of the invention. Therefore, all the equivalent technical solutions will also fall within the scope of the invention, which should be defined the appended claims.

The invention claimed is:

1. A wheel structure, comprising:
   an inner rim having a first inner annular face and a first outer annular face that are arranged radially, the first inner annular face is hollow and provided with an interface for connecting to a steering mechanism of a scooter; and
   an outer rim having a second inner annular face which is arranged radially and a second outer annular face for contacting the ground,
   wherein an intermediate connecting assembly is disposed between the first outer annular face of the inner rim and the second inner annular face of the outer rim, and the outer rim, without need for hub, contacts the inner rim in a rolling manner via the intermediate connecting assembly and is rotatable relative to the inner rim.

2. The wheel structure according to claim 1, wherein the intermediate connecting assembly is a conventional rolling bearing.

3. The wheel structure according to claim 2, wherein the conventional rolling bearing is interposed between the inner rim and the outer rim by means of being incorporated, nesting or snap fit.

4. The wheel structure according to claim 2, wherein the inner rim is axially divided into a first separated body and a second separated body, wherein the first separated body and the second separated body are each provided with an end cap shielding the conventional rolling bearing after assembly, and the first separated body and the second separated body are connected by axial screws.

5. The wheel structure according to claim 4, wherein the end cap is radially extended to such an extent that the outside diameter thereof is equivalent to the diameter of the second inner annular face of the outer rim, and there is a gap between the end cap and the outer rim in the axial direction.

6. The wheel structure according to claim 1, wherein the intermediate connecting assembly comprises an annular bracket and rollers disposed on the bracket, wherein the intermediate connecting assembly surrounds the inner rim, and the rollers are sandwiched between the first annular face and the second inner annular face after assembly.

7. The wheel structure according to claim 1, wherein one of the interface and the steering mechanism of the scooter is provided with a platform, and the other is provided with a flat plate structure; the platform is provided with a notch for receiving the flat plate structure, and the flat plate structure and the notch are connected via riveting.

8. The wheel structure according to claim 7, wherein the flat plate structure is provided at a distal end of the steering mechanism, and the platform is provided as a radially projecting structure on the first inner annular face of the inner rim.

9. A scooter, comprising
   a steering mechanism, and
   a wheel connected to the steering mechanism, wherein the wheel comprises:
     an inner rim having a first inner annular face and a first outer annular face that are arranged radially, the first inner annular face is hollow and provided with an interface for connecting to a steering mechanism of a scooter; and
     an outer rim having a second inner annular face which is arranged radially and a second outer annular face for contacting the ground,
   wherein an intermediate connecting assembly is disposed between the first outer annular face of the inner rim and the second inner annular face of the outer rim, and the outer rim, without need for hub, contacts the inner rim in a rolling manner via the intermediate connecting assembly and is rotatable relative to the inner rim.

* * * * *